Figure 1:
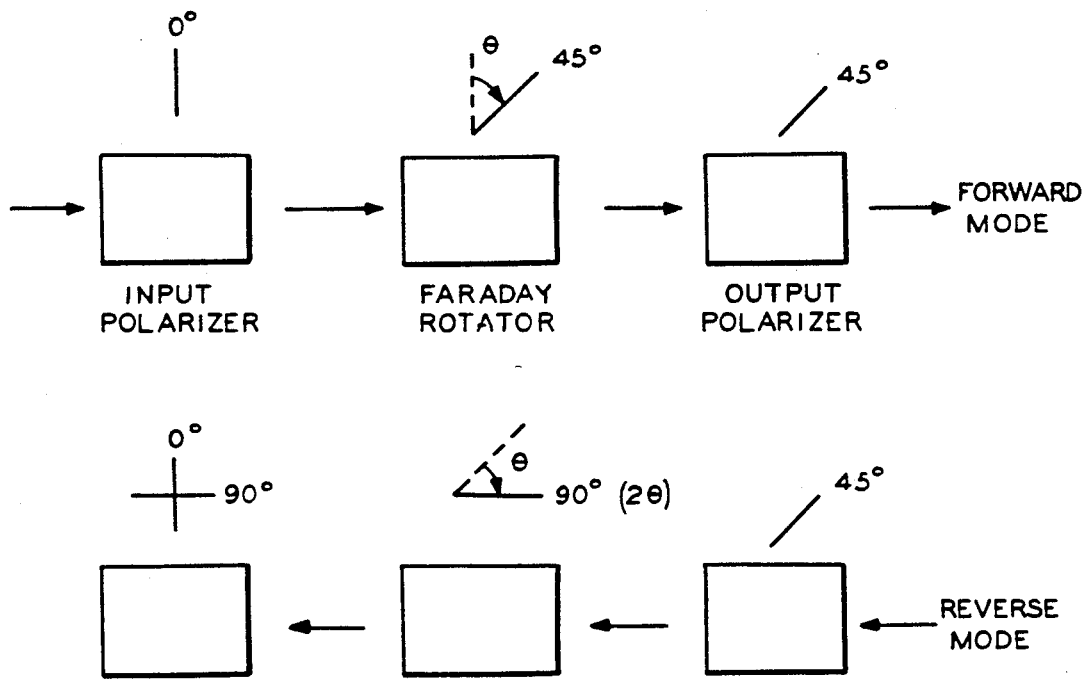

United States Patent [19]

Heiney et al.

[11] Patent Number: 5,087,984
[45] Date of Patent: * Feb. 11, 1992

[54] OPTICAL ISOLATORS EMPLOYING OPPOSITELY SIGNED FARADAY ROTATING MATERIALS

[75] Inventors: Allan J. Heiney, Highland Park; Donald K. Wilson, West Caldwell, both of N.J.

[73] Assignee: Optics for Research, Caldwell, N.J.

[*] Notice: The portion of the term of this patent subsequent to Aug. 15, 2006 has been disclaimed.

[21] Appl. No.: 502,783

[22] Filed: Mar. 9, 1990

[51] Int. Cl.$^5$ .............................................. G02F 1/09
[52] U.S. Cl. ............................ 359/282; 359/283
[58] Field of Search ............... 350/375, 376, 377, 378, 350/384, 387

[56] References Cited

U.S. PATENT DOCUMENTS

| 3,585,614 | 6/1971 | Tabor | 350/377 |
|---|---|---|---|
| 4,033,670 | 7/1977 | Tanton et al. | 350/376 |
| 4,581,579 | 4/1986 | Nagatsuma et al. | 350/375 |
| 4,591,786 | 5/1986 | Koo et al. | 350/375 |
| 4,609,257 | 9/1986 | Shirasaki | 350/376 |
| 4,756,607 | 7/1988 | Watanabe et al. | 350/376 |
| 4,804,256 | 2/1989 | Wilson | 350/376 |
| 4,840,464 | 6/1989 | Wilson | 350/375 |
| 4,856,878 | 8/1989 | Wilson et al. | 350/384 |
| 4,893,910 | 1/1990 | Birecki | 350/377 |

OTHER PUBLICATIONS

Shirasaki et al., "A Compact Polarization-Independent Optical Circulator," *Transactions of the IECE of Japan*, vol. E 64, No. 1, Jan. 1981, pp. 30 to 31.

*Primary Examiner*—Bruce Y. Arnold
*Assistant Examiner*—Martin Lerner
*Attorney, Agent, or Firm*—John N. Bain; Raymond J. Lillie

[57] ABSTRACT

A Faraday rotator having a first, or central magnet, and first and second tuning magnets a opposite ends of the central magnet. The central magnet and the tuning magnets are of opposite polarities. The central magnet surrounds a first optical element having a positive or negative Verdet constant, and the tuning magnets surround second and third optical elements, respectively. The second and third optical elements each have a Verdet constant of a sign opposite that of the first optical element. Such Faraday rotators require smaller magnet assemblies than Faraday rotators having just one optical element surrounded by the central magnet. There is also provided a Faraday rotator having at least two magnets wherein each magnet of any one pair of contiguous magnets generates a magnetic field in a direction opposite that generated by the other of the any one pair of contiguous magnets. The optical elements surrounded by these magnets have oppositely signed Verdet constants.

12 Claims, 1 Drawing Sheet

OPTICAL ISOLATOR

OPTICAL ISOLATORS EMPLOYING OPPOSITELY SIGNED FARADAY ROTATING MATERIALS

This invention relates to optical isolators and Faraday rotators which rotate the plane of polarization of polarized light. Faraday rotators comprise an optical element having an optical axis, said optical element being made of a light transmitting material having a Verdet constant, and a means for generating a magnetic field along the optical axis of the optical element, thereby rotating the plane of polarization of polarized light. More particularly, the application relates to optical isolators and Faraday rotators having tuning magnets located at opposite ends of a central magnet. The tuning magnets and the central magnet are of opposite polarities, and each tuning magnet contains an optical element. This invention also relates to optical isolators having this type of Faraday rotator.

An optical isolator is a device which prevents or reduces feedback of light transmitted from a light source. An optical isolator generally comprises an input polarizer, a Faraday rotator, and an output polarizer. The input polarizer polarizes light waves or beams traveling from a light source, such as a laser, so that the light becomes linearly polarized. In this way, a plane of polarization of polarized light is formed. The polarized light then travels to the optical element of a Faraday rotator. The Faraday rotator has a means for generating a magnetic field along an optical axis in the optical element, thereby rotating the plane of polarization of the polarized light. This rotation may be clockwise or counterclockwise. This means is usually in the form of a permanent magnet or an electromagnet, and can be in a shape of a donut which surrounds the optical element. The optical element is made of an optically transmitting material having a Verdet constant. The optical element may be in the form of a rod The Verdet constant is a measure of a material's ability to rotate the plane of polarization of polarized light. In the Faraday rotator, the plane of polarization of polarized light is rotated by a desired angle of rotation $\theta$.

After exiting the Faraday rotator, the polarized light enters the output polarizer. The output polarizer has a plane of polarization parallel to that of the light which exits the Faraday rotator. The polarized light then exits the output polarizer and enters into a system or begins its intended use. A series of reflections of the light may then occur. Some of the light is reflected back toward the original source, which travels in the reverse direction at random polarization.

The reflected polarized light, being of random polarization, re-enters the output polarizer in the reverse direction. The output polarizer creates a plane of polarization of the light at an angle of rotation $\theta$. The reflected light then exits the output polarizer and re-enters the Faraday rotator. In the Faraday rotator, the polarized light, which has a plane of polarization at a desired angle of rotation $\theta$, again has its plane of polarization at desired angle of rotation $\theta$, thus resulting in a total angle of rotation $2\theta$.

The polarized light then exits the Faraday rotator and re-enters the input polarizer. When the total angle of rotation $2\theta$ equals 90°, extinction or maximum isolation of the reflected light in the input polarizer occurs. In this way, feedback of the reflected polarized light to the light source is prevented.

It has been known in the art to use tuning magnets at the front end and the rear end of a Faraday rotator in order to optimize the field strength of the magnet which generates the magnetic field about the optical axis of the optical element in order to rotate the plane of polarization of polarized light.

U.S. Pat. No. 4,856,878, issued to Wilson, et al., discloses a Faraday rotator which comprises an optical element having an optical axis, said optical element being made of a light transmitting material, and a first magnet for generating a magnetic field along the optical axis of the optical element, said magnet having a front end and a rear end. The magnetic field is being generated in one direction and the first magnet has a specified length 1.0 L. The Faraday rotator also comprises a pair of tuning magnets, with each tuning magnet being located at a front end and a rear end of the first magnet, and each tuning magnet generates a magnetic field in a direction opposite to the direction of the magnetic field being generated by the first magnet. The total combined length of the tuning magnets may be from about 0.8 L to about 1.4 L, preferably about 1.0 L. Each tuning magnet has a length of about 0.4 L to about 0.7 L. In a preferred embodiment, each of the tuning magnets has a specified length $\frac{1}{2}$L. Each of said tuning magnets preferably is a permanent magnet. The tuning magnets may be permanent magnets made of rare earth materials containing samarium and cobalt or neodymium, iron, and boron. Such Faraday rotators optimize the strength of the magnetic field which is generated along the optical axis of the optical element. Potentials as high as 12,500 Gauss may be reached by such Faraday rotators.

In accordance with an aspect of the present invention, there is provided a Faraday rotator which comprises a first, or central, magnet which surrounds a first optical element having an optical axis. The first optical element is made of an optically transmitting material having a positive or a negative Verdet constant The first magnet has a front end and a rear end, and generates a magnetic field in a first direction along the optical axis of the first optical element. The Faraday rotator also includes first and second tuning magnets. Each tuning magnet is located at a front end or a rear end of the first magnet. The first tuning magnet and the second tuning magnet each surround a second optical element and a third optical element, respectively. The second and third optical elements each have an optical axis, and each is made of a material having a Verdet constant of a sign (positive or negative) opposite to that of the first optical element. Each of the first and second tuning magnets generates a magnetic field along the optical axis of the second and third optical elements in a direction opposite to the direction of the magnetic field generated by the first magnet (i.e., the first, or central, magnet, and the tuning magnets are of opposite polarities).

In accordance with the present invention, when the first optical element is made of a material which has a positive Verdet constant, the second and third optical elements each are made of material(s) which have negative Verdet constants. When the first optical element is made of a material which has a negative Verdet constant, the second and third optical elements are each made of material(s) which have a positive Verdet constant. Materials which have a positive verdet constant include zinc sulfide, zinc selenide, arsenic trisulfide, and an arsenic-germanium selenium crystal material having from about 15 wt. % to about 50 wt. % germanium, from about 5 wt. % to about 20 wt. % arsenic, and from about 30 wt. % to about 80 wt. % selenium. A preferred positive Verdet constant material is an arsenic-germanium-selenium crystal material known as AMTIR. The use of such a crystal in a Faraday rotator is described in U.S. Pat. No. 4,840,464. Materials having a negative Verdet constant include paramagnetic materials such as terbium-gallium-garnet and cadmium-manganese-telluride, yttrium-iron-garnet, and ferromagnetic materials such as galdolinium-gallium garnet (GGG) or large lattice constant (LLC) discs coated with bismuth-iron-garnet films.

Preferred optical elements having negative Verdet constants are formed from at least one disc formed from a material selected from the class consisting of $Gd_3Ga_5O_{12}(GGG)$ and $Gd_{2.68}Ca_{0.32}Ga_{4.02}Mg_{0.33}Sr_{0.65}O_{12}(LLC)$, and each of said at least one disc(s) is coated with a bismuth and iron, and oxygen-containing film, also known as a BIG film.

When a GGG disc is employed, a preferred film is of the composition:

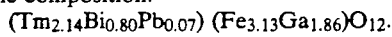
$(Tm_{2.14}Bi_{0.80}Pb_{0.07}) (Fe_{3.13}Ga_{1.86})O_{12}$.

When an LLC disc is employed, a preferred film is of the composition:

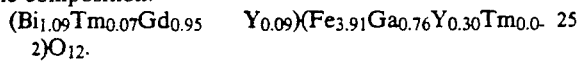
$(Bi_{1.09}Tm_{0.07}Gd_{0.95}\quad Y_{0.09})(Fe_{3.91}Ga_{0.76}Y_{0.30}Tm_{0.02})O_{12}$.

Such discs may be made according to a procedure described in Belt, et al., "Growth of Bismuth Garnet Films for High Figure of Merit Faraday Effect Devices," SPIE, Vol. 753, pgs. 142–149 (1987). Such optical elements are further described in co-pending U.S. patent application Ser. No. 393,143, filed Aug. 14, 1989.

A material having a positive Verdet constant will rotate the plane of polarization of polarized light clockwise in a magnet having a north-south polarity, and counterclockwise in a magnet having a south-north polarity. A negative Verdet constant material will rotate the plane of polarization of polarized light counterclockwise in a magnet having a north-south polarity, and clockwise in a magnet having a south-north polarity. It is to be understood that a magnet having a north-south polarity generates a magnetic field in a direction opposite to that of a magnet having a south-north polarity.

By constructing a Faraday rotator wherein optical elements of oppositely-signed Verdet constants are contained within magnets of opposite polarities, applicants have found that the total length of the Faraday rotator is shorter as compared to Faraday rotators employing two end magnets of opposite polarities to that of a central magnet, wherein only the central magnet contains the optical element. In Applicants' invention, all of the magnetic fields which are generated serve to rotate the plane of polarization of polarized light.

In a preferred embodiment, the first magnet has a specified length of 1.0 L, and the first and second tuning magnets have a combined length of from about 0.8 L to about 1.4 L. More preferably, each of first and second tuning magnets has a length of from about 0.4 L to about 0.7 L, and most preferably of about $\frac{1}{2}$L.

In one embodiment, each of the first and second tuning magnets is a permanent magnet. The permanent magnet may be made of a material containing samarium and cobalt, or, alternatively, the permanent magnet may be made of a material containing neodymium, iron, and boron.

In accordance with yet another aspect of the present invention, there is provided a Faraday rotator comprising at least two magnets. Each of the at least two magnets surrounds an optical element having an optical axis. Each optical element is made of an optically-transmitting material having a positive or negative Verdet constant. Each of said at least two magnets generates a magnetic field along the optical axis of an optical element. Each magnet of any one pair of contiguous magnets of said at least two magnets generates a magnetic field along the optical axis of the optical element surrounded by said magnet in a direction opposite the direction of the magnetic field generated by the other of said any one pair of contiguous magnets, along the optical axis of the optical element surrounded by the other of the any one pair of contiguous magnets. The optical elements surrounded by each of the any one pair of contiguous magnets are made of materials having oppositely signed (positive or negative) Verdet constants; eg., of one or a first optical element surrounded by magnet has a positive Verdet constant, the optical element surrounded by a magnet contiguous to the magnet surrounding the first optical element will have a negative Verdet constant. Although such a Faraday rotator has at least two magnets and two optical elements, it is possible within the scope of the present invention to use as many magnets as one chooses, as long as at least two magnets and two optical elements are present in the Faraday rotator.

In accordance with another aspect of the present invention, there is provided an optical isolator containing a Faraday rotator as hereinabove described.

Figure 2:
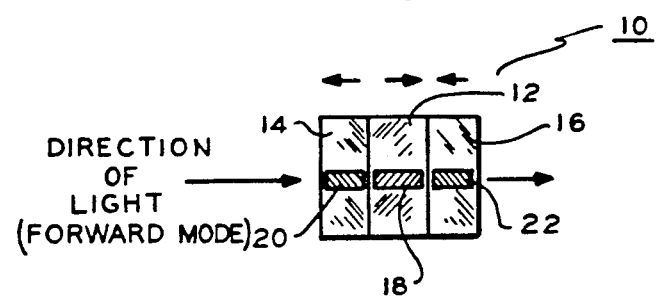

The invention will now be described with respect to the drawings, wherein:

FIG. 1 is a block diagram of an example of how an optical isolator rotates the plane of polarization of polarized light; and FIG. 2 is a cross-sectional view of an embodiment of a Faraday rotator in accordance with the present invention.

Referring now to the drawings, light from a source enters an input polarizer, whereby light which has been transmitted from the source in one direction is linearly polarized. In this way, a plane of polarization of polarized light is created.

The polarized light, traveling in the forward mode, enters the Faraday rotator 10. Faraday rotator 10 includes a first magnet 12 which generates a magnetic field in a first direction, and first tuning magnet 14 at one end of first magnet 12 and second tuning magnet 16 at the other end of first magnet 12. Tuning magnets 14 and 16 each generate a magnetic field in a direction opposite to that generated by first magnet 12. First magnet 12 may be a permanent magnet or an electromagnet. A permanent magnet is preferred. First magnet 12 has a length L. First and second tuning magnets 14 and 16 are also preferably permanent magnets. Tuning magnets 14 and 16 may be made of rare earth materials such as samarium and cobalt or neodymium, iron, and boron. In a preferred embodiment, each of tuning magnets 14 and 16 has a length of from about 0.4 L to about 0.7 L, most preferably of about $\frac{1}{2}$L. The combined length of the tuning magnets 14 and 16, therefore, may be from about 0.8 L to about 1.4 L, most preferably at about 1.0 L.

First magnet 12, as well as tuning magnets 14 and 16 each have an annulus, and are disc or donut-shaped magnets. First magnet 12 surrounds a first optical element 18, which is made of an optically transmitting material having a positive or negative Verdet constant.

First magnet 12 generates a magnetic field in a first direction along the optical axis of optical element 18, causing the rotation of the plane of polarization of polarized light. First tuning magnet 14 surrounds second optical element 20, and generates a magnetic field in a direction opposite of that generated by first magnet 12, and has a polarity opposite that of first magnet 12. Second optical element 20 is made of an optically transmitting material having a Verdet constant of a sign (positive or negative) opposite that of the material of first optical element 18. Second tuning magnet 16 surrounds third optical element 22. Second tuning magnet 16 generates a magnetic field in a direction opposite of that generated by first magnet 12, and the same as that generated by first tuning magnet 14. The polarity of second tuning magnet 16 is thus opposite that of first magnet 12, and the same as that of first tuning magnet 14. Third optical element 22 is made of an optically transmitting material having a Verdet constant of the same sign (positive or negative) as second optical element 20, and opposite that of first optical element 18.

Polarized light, traveling in the forward mode, first enters second optical element 20 of Faraday rotator 10. Second optical element 20 is surrounded by first tuning magnet 14, which generates a magnetic field along the optical axis of second optical element 20, thereby beginning the rotation of the plane of polarization of the polarized light. This rotation, depending upon the Verdet constant of second optical element 20, and the direction of generation of the magnetic field (which is defined by the polarity of the tuning magnet 14), may be in a clockwise or counterclockwise direction. The polarized light then enters exits second optical element 20 and enters first optical element 18, which has a Verdet constant opposite that of second optical element 20. First optical element 18 is surrounded by first magnet 12. First magnet 12 generates a magnetic field along the optical axis of first optical element 18 in a direction opposite that of the magnetic field generated by first tuning magnet 14. Because first magnet 12 generates a magnetic field in a direction opposite that of first tuning magnet 14, and because first optical element 18 has a Verdet constant of a sign opposite that of second optical element 20, the rotation of the plane of polarization of polarized light will continue in the same direction (clockwise or counterclockwise) in which it started in second optical element 20.

The polarized light then exits first optical element 18 and enters third optical element 22, which is surrounded by second tuning magnet 16. Second tuning magnet generates a magnetic field along the optical axis of third optical element 22 in a direction which is opposite that of first magnet 12, but the same as that of first tuning magnet 14. Third optical element 22 has a Verdet constant of a sign (positive or negative) opposite that of first optical element 18, but the same as that of second optical element 20. Preferably, second optical element 20 and third optical element 22 are made of the same optically transmitting material(s), although all that is required within the scope of the present invention is that second optical element 20 and third optical element 22 both have a positive or a negative Verdet constant. Because second tuning magnet 16 generates a magnetic field in a direction opposite to that generated by first magnet 12, and because third optical element 22 has a Verdet constant (positive or negative) opposite that of first optical element 18, the rotation of the plane of polarization of polarized light is continued in the same direction as in second optical element 20 and first optical element 18. As the polarized light exits third optical element 22, the plane of polarization of polarized light is rotated by an optimum angle of rotation $\theta$. In the embodiments shown, the angle of rotation by which the plane of polarization is rotated is 45°.

After the plane of polarization of the polarized light has been rotated, the polarized light exits third optical element 22 of the Faraday rotator 10 and enters the output polarizer. The output polarizer has a plane of polarization parallel to the plane of polarization of the light which has exited the Faraday rotator The polarized light then enters into a system or begins its intended use whereby a series of reflections can occur. Some of the light is reflected back toward the light source, thereby traveling in the reverse direction and at random polarization.

The reflected polarized light, traveling in the reverse mode at random polarization, re-enters the output polarizer, wherein the reflected polarized light is polarized in a plane of polarization at desired angle of rotation $\theta$, or, in the preferred embodiment, 45°. The reflected polarized light then re-enters third optical element 22 of the Faraday rotator 10, and then passes through first optical element 18 and second optical element 20.

As reflected polarized light passes through third optical element 22, first optical element 18, and second optical element 20 of the Faraday rotator 10, the reflected polarized light, which has a plane of polarization at an angle of rotation of 45°, or $\theta$, has its plane of polarization rotated another 45°, or $\theta$, thus making the total angle of rotation of the plane of polarization 90°, or $2\theta$. The reflected polarized light has its plane of polarization rotated in the Faraday rotator 10 by the generation of magnetic fields along the optical axes of the optical elements 22, 18, and 20 by the donut magnets 16, 12, and 14, respectively.

Upon rotation of the plane of polarization of the reflected polarized light another 45°, or $\theta$, for a total angle of rotation of 90°, or $2\theta$, the reflected polarized light exits the Faraday rotator and enters the input polarizer. In the input polarizer, the reflected polarized becomes extinct or maximally isolated. In this way, the optical isolator prevents feedback of transmitted light. Although the Faraday rotator in the embodiment shown rotates the plane of polarization of polarized light 45° at each pass of polarized light through the optical element, the angle of rotation may be other than 45°, thus making the total angle of rotation $2\theta$ of the plane of polarization of reflected polarized light other than 90°. In such embodiments, there may be some feedback of reflected transmitted light to the light source, but less feedback than if no optical isolator were present.

Advantages of the present invention include the ability to employ a Faraday rotator having an overall length which is shorter than prior art Faraday rotators. For example, Applicants have achieved 45° rotation of the plane of polarization of polarized light by employing a Faraday rotator having a first optical element of terbium-gallium-garnet (having a negative Verdet constant) surrounded by a first, or central magnet of north-south polarity Second and third optical elements, each of AMTIR (having a positive Verdet constant), are each surrounded by a magnet of south-north polarity, located at opposite ends of the central magnet. Each of the optical elements is 6 mm long, and each optical element rotates the plane of polarization of polarized light about 15° in the counterclockwise direction. The total length of the magnet assembly of this Faraday rotator is about 2.1 inches. Conventional Faraday rotators which utilize only a single terbium-gallium-garnet optical isolator, require a magnet assembly of 2.6 inches in order to achieve the same rotation of the plane of polarization of polarized light.

It is to be understood, however, that the Faraday rotator and optical isolator of the present invention are not to be limited to the specific embodiments described above. The invention may be practiced other than as particularly described and still be within the scope of the accompanying claims.

What is claimed is:

1. A Faraday rotator comprising:
a first magnet surrounding a first optical element having an optical axis, said first optical element made of a material having a positive Verdet constant or a negative Verdet constant, said first magnet having a front end and rear end, said first magnet generating a magnetic field in a first direction along the optical axis of said first optical element, said first magnet having a specified length of 1.0 L; and first and second tuning magnets, each tuning magnet being located at a front end or a rear end of said first magnet, said first tuning magnet and said second tuning magnet each surrounding a second optical element and a third optical element, respectively, said second and third optical elements each having an optical axis, and each of said second optical element and said third optical element being made of a material having a Verdet constant of a sign opposite that of the Verdet constant of said first optical element, and each of said first and second tuning magnets generating a magnetic field along the optical axes of said second and third optical elements in a direction opposite to the direction of the magnetic field being generated by said first magnet, wherein the total combined length of said first and second tuning magnets is from about 0.8 L to about 1.4 L.

2. The Faraday rotator of claim 1 wherein each of said first and second tuning magnets has a length of from about 0.4 L to about 0.7 L.

3. The Faraday rotator of claim 2 wherein each of said first and second tuning magnets has a specified length of about ½L.

4. The Faraday rotator of claim 1 wherein each of said first and second tuning magnets is a permanent magnet.

5. The Faraday rotator of claim 4 wherein each of said first and second tuning magnets is a permanent magnet made of a material containing samarium and cobalt.

6. The Faraday reactor of claim 4 wherein each of said first and second tuning magnets is a permanent magnet made of a material containing neodymium, iron, and boron.

7. An optical isolator comprising:
an input polarizer;
a Faraday rotator comprising a first magnet surrounding a first optical element having an optical axis, said first optical element made of a material having a positive Verdet constant or a negative Verdet constant, said first magnet having a front end and a rear end, said first magnet generating a magnetic field in a first direction along the optical axis of said first optical element, said first magnet having a specified length of 1.0 L; and
first and second tuning magnets, each tuning magnet being located at a front end or a rear end of said first magnet, said first tuning magnet and said second tuning magnet each surrounding a second optical element and a third optical element, respectively, said second and third optical elements each having an optical axis, and each of said second optical element and said third optical element being made of a material having a Verdet constant of a sign opposite that of the Verdet constant of said first optical element, and each of said first and second tuning magnets generating a magnetic field along the optical axes of said second and third optical elements in a direction opposite to the direction of the magnetic field being generated by said first magnet, wherein the total combined length of said first and second tuning magnets is from about 0.8 L to about 1.4 L; and
an output polarizer.

8. The optical isolator of claim 7 wherein each of said first and second tuning magnets has a length of from about 0.4 L to about 0.7 L.

9. The optical isolator of claim 8 wherein each of said first and second tuning magnets has a specified length of about ½L.

10. The optical isolator of claim 7 wherein each of said first and second tuning magnets is a permanent magnet.

11. The optical isolator of claim 10 wherein each of said first and second tuning magnets is a permanent magnet made of a material containing samarium and cobalt.

12. The optical isolator of claim 10 wherein each of said first and second tuning magnets is a permanent magnet made of a material containing neodymium, iron, and boron.

* * * * *